United States Patent [19]

Arnold et al.

[11] Patent Number: 4,901,368

[45] Date of Patent: Feb. 13, 1990

[54] FREQUENCY TRANSLATION CORRECTION SCHEME FOR SATELLITE COMMUNICATION SYSTEM

[75] Inventors: M. Phillip Arnold, Melbourne; George W. Waters, Indialantic, both of Fla.

[73] Assignees: American Telephone and Telegraph Company, New York, N.Y.; AT&T Bell Laboratories, Murray Hill, N.J.

[21] Appl. No.: 390,483

[22] Filed: Aug. 2, 1989

Related U.S. Application Data

[63] Continuation of Ser. No. 109,450, Oct. 19, 1987, abandoned.

[51] Int. Cl.[4] ............................................. H04B 7/185
[52] U.S. Cl. ...................................... 455/12; 455/69; 455/71; 370/74; 342/358
[58] Field of Search ...................... 455/12, 23, 51, 52, 455/9, 10, 11, 69, 70, 71; 375/3, 58, 109; 370/70, 74, 75, 104; 342/358

[56] References Cited

U.S. PATENT DOCUMENTS

| | | | |
|---|---|---|---|
| 3,991,372 | 11/1976 | Sassler | 455/71 |
| 4,002,980 | 1/1977 | Herz | 370/75 |
| 4,191,923 | 3/1980 | Schelisch | 455/71 |
| 4,509,200 | 4/1985 | Luginbuhl et al. | 455/12 |
| 4,592,050 | 5/1986 | Bensadon | 370/104 X |
| 4,602,375 | 7/1986 | Inukai | 370/104 X |
| 4,607,257 | 8/1986 | Noguchi | 370/104 X |
| 4,618,996 | 10/1986 | Rafal et al. | 370/74 X |
| 4,689,787 | 8/1987 | Hotta | 370/104 |
| 4,697,187 | 9/1987 | Ohno et al. | 455/12 X |
| 4,752,967 | 6/1988 | Bustamante et al. | 455/69 |

Primary Examiner—Robert L. Griffin
Assistant Examiner—Ralph Smith
Attorney, Agent, or Firm—Erwin W. Pfeifle

[57] ABSTRACT

In a time division multiple access satellite communications system having a master station and one or more remote stations, frequency offset through the translation oscillator in the satellite is corrected by transmitting a pilot frequency signal, reference to a high precision oscillator, through the satellite, so as to subject the pilot frequency signal to a frequency translation and monitoring the frequency translation of the pilot frequency signal as received at the master station subsequent to its transmission through the satellite. Signals to be transmitted over the satellite communications link from the master station to remote stations are subjected to a frequency translation that is effectively complementary to the monitored frequency translation. At a remote station, received signals are monitored for a difference in the corrected frequency (base upon the use of the precision oscillator at the master site) relative to a prescribed frequency and signals to be transmitted from the remote station to the master station are adjusted by an amount that effectively compensates for the difference between the prescribed frequency and the monitored frequency.

32 Claims, 5 Drawing Sheets

FREQUENCY TRANSLATION CORRECTION SCHEME FOR SATELLITE COMMUNICATION SYSTEM

This application is a continuation of application Ser. No. 109,450, filed on Oct. 19, 1987, now abandoned.

FIELD OF THE INVENTION

The present invention relates in general to satellite communication systems and is particularly directed to a mechanism for correcting for the frequency offset through a satellite communication channel imparted by the (drift-susceptible) translation reference oscillator in the satellite.

BACKGROUND OF THE INVENTION

The successful operation of satellite communication networks, such as time division multiple access (TDMA) systems, depends upon the ability of the receiver equipment at the respective sites to be accurately tuned to the incoming signal from another site. Because a TDMA system employs burst communications it is not possible to use a conventional automatic frequency adjustment mechanism which relies upon the presence of a continuous carrier. Consequently it has been a common (and extremely costly) practice to provide each site with a high precision oscillator which monitors an effectively perfectly stable pilot frequency transmitted from a master site and determines the offset through the satellite.

One proposal to eliminate the need for a precision oscillator at each site and thereby reduce the expense of the equipment at the remote sites is described in the Luginbuhl et al, U.S. Pat. No. 4,509,200, entitled 'Satellite Telecommunication System'. Pursuant to the patented scheme a high precision pilot tone oscillator is installed at a central site, the only apparent purpose of which is to measure frequency offset (drift) through the satellite. By monitoring the pilot tone over a loop back to itself the master site is able to measure the offset through the satellite, which must be corrected. The measured error is then transmitted as an information signal for use at the remote site. The remote site must strip off the data and then use the data to properly tune itself (not having the benefit of a precision local oscillator). This presupposes that the remote site is properly tuned to begin with, something that the coarse oscillator used by the remote site cannot guarantee. Consequently, the procedure is questionable, at best.

SUMMARY OF THE INVENTION

In accordance with the present invention, rather than make an error (frequency translation) measurement and then transmit that error as an information signal, as in the above-referenced questionable patented scheme, the measured frequency offset through the satellite is used to premodify signals transmitted from the master site to a remote site such that there is an effective complementary frequency translation on the uplink. As a result, the pre-offset signals conveyed through the satellite and received by a remote site will have been translated back to their correct frequency and can be readily demodulated by the remote site.

More specifically, in a time division multiple access satellite communications system having a master site and one or more remote sites, frequency offset through the translation oscillator in the satellite is corrected by looping a reference channel at the master site using a high precision reference oscillator. Any frequency offset subjected by a pilot tone transmitted over the reference channel is used to fine tune the master site downconverter and to remove the offset and precorrect an up-converter that operates off the precision oscillator and through which information signals to be transmitted to a remote site are transmitted. Because of this precorrection, the signals received by the remote site are at the correct frequency, so that the precision reference oscillator frequency component of the received signal can be used to adjust the frequency of signals transmitted from the remote site back to the master site.

DETAILED DESCRIPTION

Figure 1:
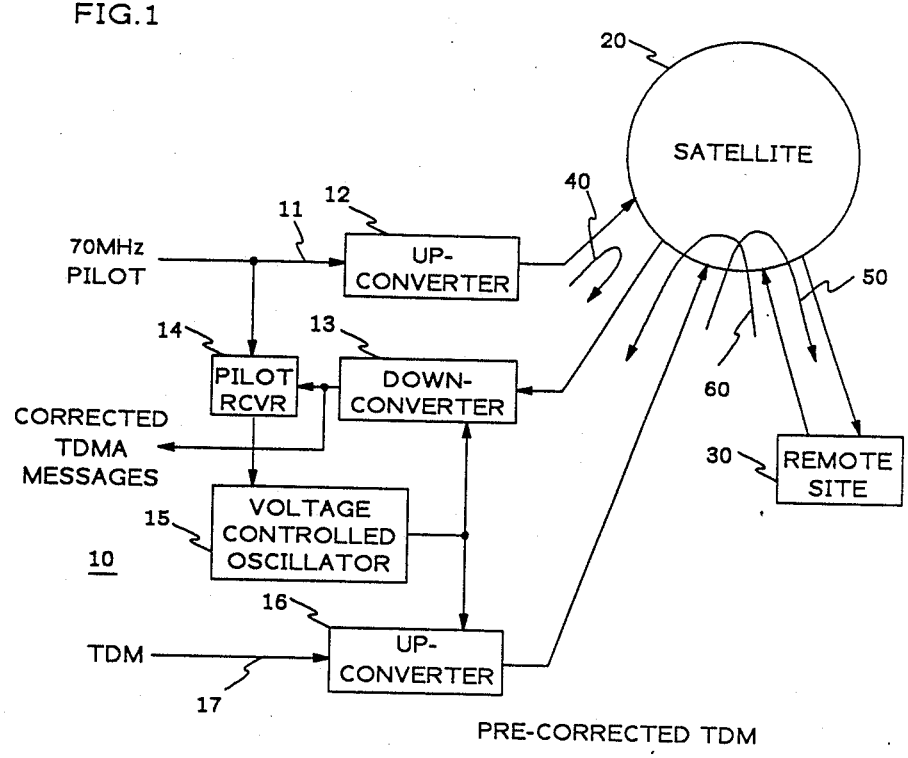
FIG. 1 is a diagrammatic illustration of a satellite communications system employing a frequency offset (translation) correction scheme in accordance with a first embodiment of the invention.

Before describing in detail the particular improved frequency translation correction scheme in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a satellite communications system is shown diagrammatically as comprising a central or master site 10, a satellite 20 and a remote site 30. It is to be understood that remote site 30 may comprise one or more geographically separated sites, each of which is uniquely identified by a prescribed time slot during which communications from the remote site to the master site over a time division multiple access (TDMA) link are effected.

As described above, only the master site contains a precision oscillator through which communications between the master and remote sites are controlled. Regardless of the precision and of the equipment at the master site, however, there is a frequency offset through the satellite 20 (encompassing retransmission frequency and drift frequency) which must be taken into account to assure proper reception for both directions of transmission. This correction is accomplished at the master site by transmitting a reference or pilot tone (e.g. intermediate frequency (IF)) over link 11 to an up-converter 12 which utilizes a precision reference oscillator (e.g. 10 MHz). Up-converter 12 outputs a pilot tone $F_P$ over a master site-satellite-master site loop 40, so that at the master site the received signal contains the pilot tone $F_p$ plus the frequency offset $\Delta F$ imparted by the satellite 20. This received signal is coupled to a down-converter 13. The output of down-converter 13 is coupled to a pilot receiver 14, which also is coupled to receive the pilot or reference tone supplied over link 11. The output of pilot receiver 14 is a voltage representative of the frequency offset imparted by satellite 20 (including any drift) and is used to drive a voltage controlled oscillator 15, the output of which is representative of the offset and is used to adjust the operation of down-converter 13. As a consequence, the output of down-converter 13 will be at the correct frequency (for example the original pilot tone supplied over link 11).

In accordance with the present invention, the output of voltage controlled oscillator 15 is also coupled to a further up converter 16 to which data channel 17 is coupled. Data channel 17 contains time division multiplex signals intended for transmission to the remote site 30 via the satellite 20. Using the frequency offset provided by voltage controlled oscillator 15, up-converter 16 introduces a precorrection frequency offset that effectively counters the frequency shift imparted by the satellite 20. As a result, the time division multiplex signals that are transmitted over a data channel 50 from the master site 10 through the satellite 20 to the remote site 30 and received at the remote site 30 have the accuracy of the (10 MHz) precision reference oscillator employed at the master site.

Figure 2:
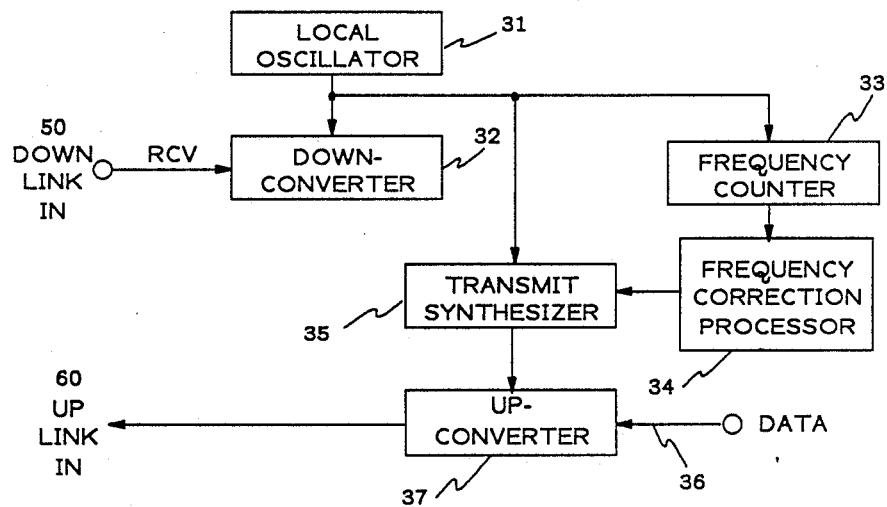
FIG. 2 is a diagrammatic illustration of the configuration of a remote site in the system of FIG. 1.

At the remote site, diagrammatically illustrated in FIG. 2, the incoming TDM frequency supplied to a down-converter 31 which is driven by a coarse local oscillator 32. The output of down-converter 31 is coupled to a frequency counter 33 which produces an output indicative of the actual down-converted frequency (e.g. 10.702 MHz). The output of frequency counter 33 is preferably a digitized code which is coupled to a remote site control processor 34. Processor 34 compares the actual frequency data supplied by frequency counter 33 with a nominal value to which the local (coarse) oscillator has been preset. Assuming, for purposes of illustration, that the local oscillator has been preset at 10.700 MHz, (a frequency value preprogrammed into processor 34) then an error of 2 KHz will be produced. Processor 34 contains a communications control program through which the operation of a remote site transmit frequency synthesizer 35 is controlled. The control program computes a precorrected transmission frequency based upon the error (e.g the 2 KHz error) and computes a correction transmission frequency due to the error in the local oscillator 32. As a result, the output frequency produced by synthesizer 35 is precorrected to take into account the error in the local oscillator 32. The output of synthesizer 35 is coupled to an up-converter 37 to which data to be transmitted from the remote site 30 to the master site 10 is supplied over link 36. The output of up-converter 37 is transmitted over an up-link communication channel 60 from remote site 30 through satellite 20 to master site 10. This remote site-to-master site communication channel 60 undergoes the frequency offset imparted by satellite 20 in the same manner that the pilot frequency, described above, is impacted over loop 40. With down-converter 13 receiving the remote site-to-master site TDMA channel, the incoming data will be corrected in the same manner that the original pilot frequency was corrected, so that the output of down-converter 13 will be at the correct frequency of interest.

In the system described above, the communications equipment aboard the satellite 20 employs a single translation oscillator which, together with the drift through the link, imparts the frequency offset which is precorrected pursuant to the present invention. In some communication satellites, however, more than one translation oscillator is employed, particularly where remote stations are geographically disbursed over a wide continental area, such as a north American continent east/west network. In such geographically disbursed networks, the satellite links may be predediacted such that all up-links in the eastern half of a geographical area may employ one dedicated oscillator within the satellite, while all up links on the western half of the area may employ another dedicated translation oscillator, the frequency of which is different from that of the one oscillator. When the master site cannot see both the east and west downlinks, the correction scheme becomes more difficult.

Figure 3:
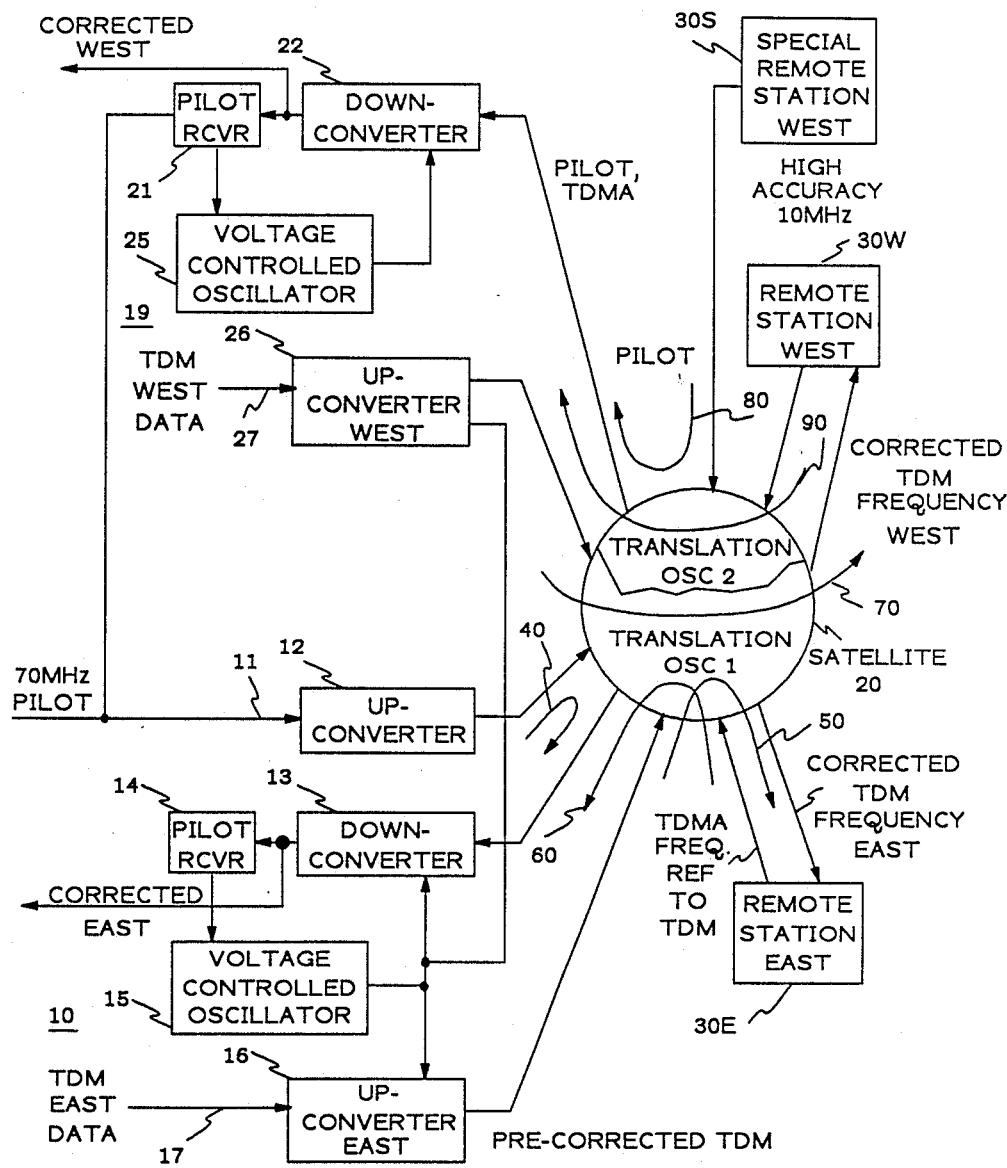
FIG. 3 is a diagrammatic illustration of a satellite communications system employing a frequency offset correction scheme in accordance with a second embodiment of the invention.

FIG. 3 diagrammatically illustrates an embodiment of a satellite communications network incorporating equipment described above with reference to FIG. 1, but modified to take into account the use of separate translation oscillators in the satellite for such a geographically disbursed system. In the embodiment shown in FIG. 3, master site 10 is configured identically to that of the master site 10 of the network shown in FIG. 1. Similarly, an east remote site 30E corresponds to the remote site 30 of the network shown in FIG. 1, with satellite 20 containing a dedicated translation oscillator specifically assigned for communications originating from the eastern portion of the network.

Also shown in FIG. 3 is a geographically separated western site 19 which communicates over a east master-to-west channel 70 through the same translation oscillator that carries channel 50 for east-to-east transmissions. Consequently, a west up-converter 26 which receives incoming TDM signals to be transmitted over channel 70 to a remote west site 30W is precorrected by the same frequency offset produced by voltage controlled oscillator 15 which drives up-converter 16 for the eastern portion of the system.

For remote west-master site transmissions, however, satellite 20 employs a separate translation oscillator for effecting communications between the remote site 30W and the master site 10. Consequently, the correction frequency offset imparted for the eastern portion of the link cannot be used for the return from the west remote site. Instead, compensation is provided by the use of an additional high accuracy reference frequency generated at a special remote site 30S and looped through the second translation oscillator in the satellite 20, via communication path 80, to a separate pilot receiver 21 in the master site. The special remote terminal 30S generates a continuous unmodulated pilot which is applied to a frequency lock loop dedicated for the purpose employing down-converter 22, pilot receiver 21 and voltage control oscillator 25, connected in a feedback loop corresponding to the correction loop of down-converter 13, pilot receiver 14 and voltage controlled oscillator 15 for the first translation oscillator employed in the satellite. TDM signals which are transmitted from the remote west site 30W over link 90 through the second translation oscillator within the satellite 20 are corrected through the feedback loop which monitors the pilot tone from the special remote terminal 30S, so that the output of down-converter 22 restores the original signals transmitted from site 30W to their correct frequency.

Figure 4:
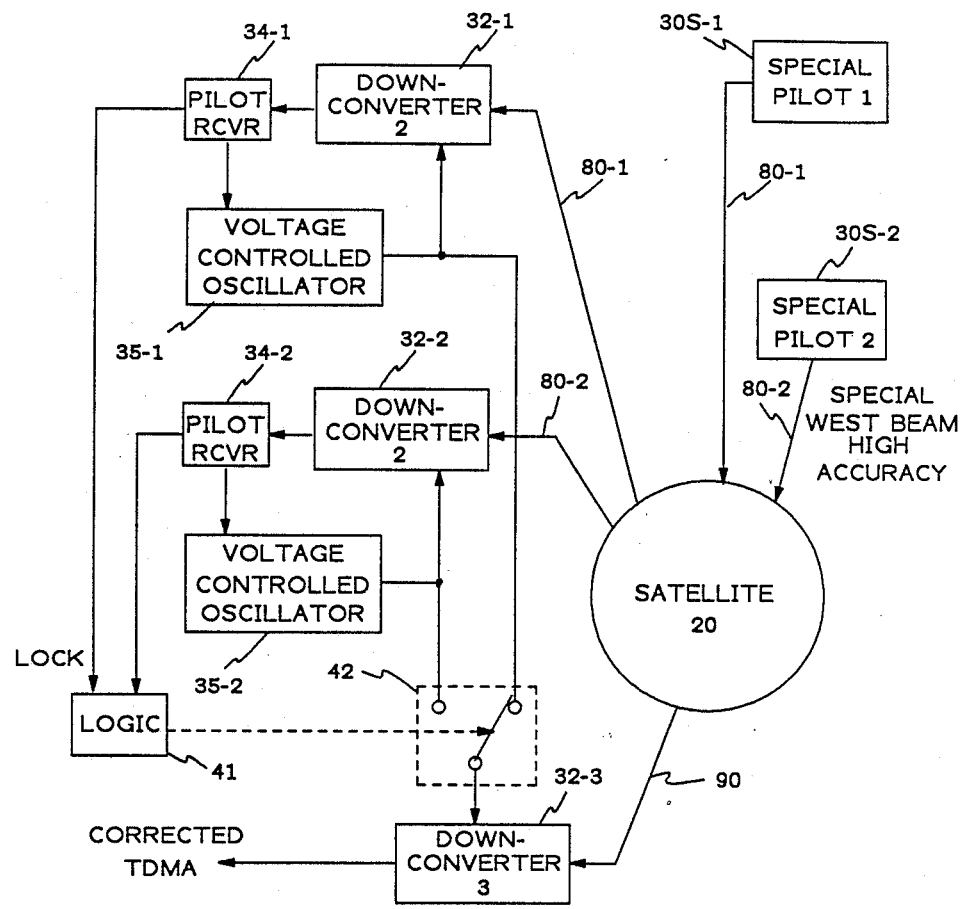
FIG. 4 is a diagrammatic illustration of the configuration of a signal fade prevention scheme for use with the system of FIG. 3.

To guard against the possibility of a rain fade from disrupting the pilot transmission from remote site 30S, the use of a second special pilot tone (such as an 11 MHz tone) may be transmitted from another special remote site geographically separated from remote site 30S. A scheme for providing such a rain fade prevention scheme is diagrammatically illustrated in FIG. 4. As shown therein, rather than use a single special remote site 30S, a pair of special pilot generating sites 30S-1 and 30S-2, geographically displaced from one another and remote with respect to the remote west site 30W of FIG. 3, are employed. Each of sites 30S-1 and 30S-2 generates a pilot that is offset in frequency from the pilot tone generated by the other site. Each pilot is transmitted through the second translation oscillator within the satellite 20 over respective loop 80-1 and 80-2 to the master site 10. At the master site, in place of a single frequency lock loop for the special pilot tone, as described above with reference to FIG. 3, a pair of pilot receivers 34-1, 34-2 are employed. For the first special pilot tone from site 30S-1, master site 10 employs a down converter 32-1, a pilot receiver 34-1 and a feedback voltage controlled oscillator 35-1. For the second special pilot tone, respective down converter 32-2, pilot tone receiver 34-2 and voltage controlled oscillator 35-2 are used.

The status output of each respective pilot receiver 34-1 and 34-2 is coupled to a decision logic circuit 41. Logic circuit 41 monitors the lock status of each pilot receiver 34-1 and 34-2 and controls a switch 42 which is coupled to the output of each of voltage controlled oscillators 35-1 and 35-2 to a further down converter 32-3 so as to drive down converter 32-3 with the locked pilot receiver and enable recovery of the TDMA signals from the remote site 30W over transmission channel 90.

Figure 5:
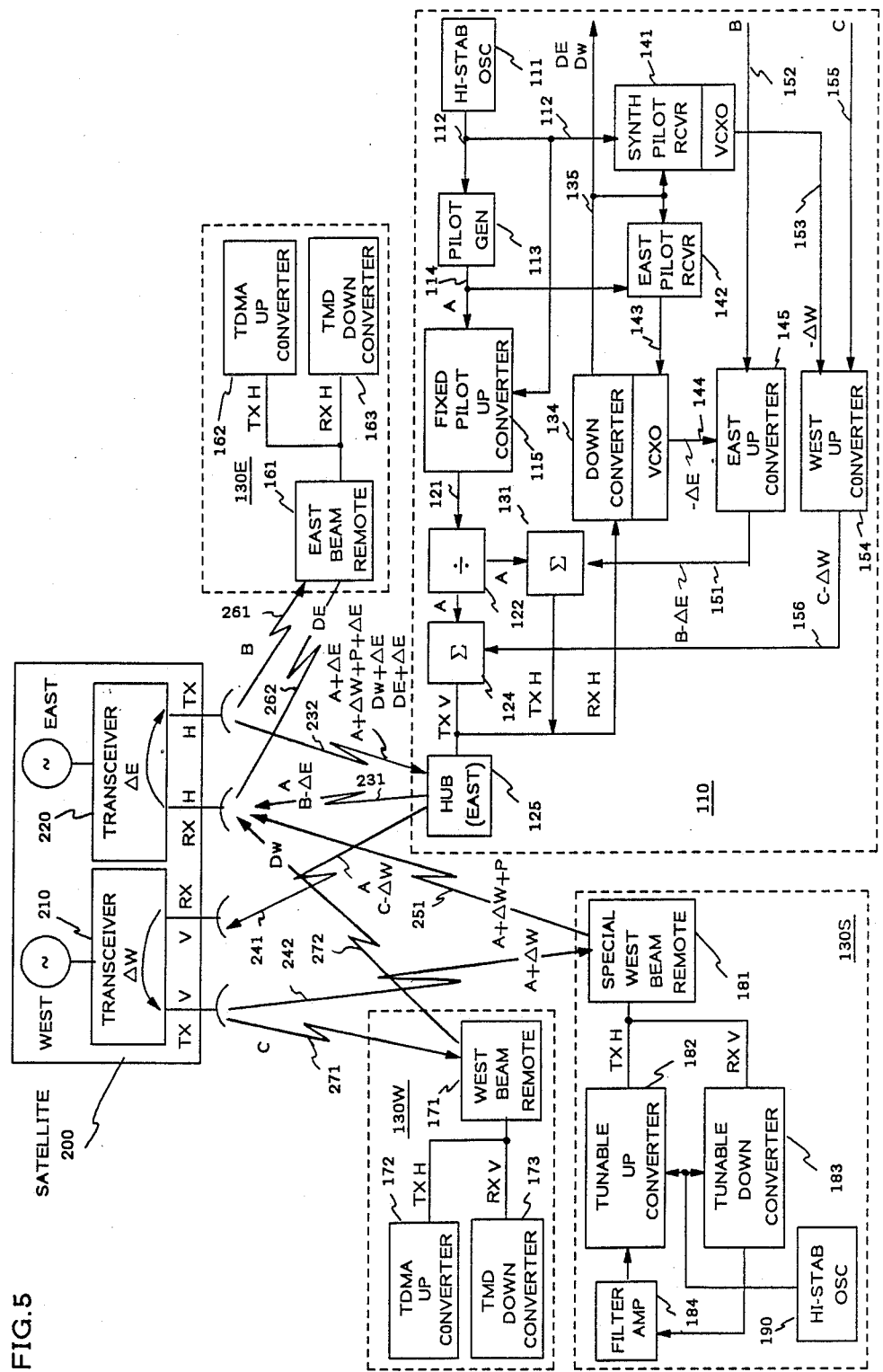
FIG. 5 is a diagrammatic illustration of a satellite communications system employing a frequency offset correction scheme in accordance with a third embodiment of the invention.

FIG. 5 diagrammatically illustrates a further embodiment of a satellite communications network, incorporating equipment described above with reference to FIG. 1, that has been modified to take into account the use of separate translation oscillators in the satellite for a geographically disbursed system. Like the embodiment shown in FIG. 3, described above, the system shown in FIG. 5 employs a master site (east master site 110), and a special (west) remote site 130S, each of which contains a respective precision oscillator to enable accurate measurement of and compensation for frequency translations through respective translators 220 and 210 for east bound and west bound transmissions, respectively, of a satellite 200 which differs from satellite 20 in the way the translation oscillators are dedicated. Also shown in FIG. 5 are respective east and west remote sites 130E and 130W, respectively.

The master or hub site 110 contains a first, highly stable reference oscillator 111, the output of which is coupled over link 112 to a pilot tone generator 113, to a pilot up-converter 115 and to a synthesized pilot receiver 141. Pilot generator 113 couples a fixed pilot tone A over link 114 to pilot up-converter 115 and to an east pilot receiver 142. The output of pilot up-converter 115 is coupled to a signal splitter 122 and coupled therefrom to first inputs of respective west and east summing circuits 124 and 131. East summing circuit 131 has a second input coupled over link 151 to the output of an east up-converter 145 which receives a master-to-east remote data signal B over link 152. The local oscillator input for east up-converter 145 is supplied over link 144 from the output of a voltage controlled oscillator within a down-converter 134, that is driven by east pilot receiver 142. Similarly, west summing circuit 124 has a second input coupled over link 156 to the output of a west up-converter 154, which receives a master-to west remote data signal C over link 155. The local oscillator input for west up-converter 154 is supplied over link 153 from the output of a voltage controlled oscillator within synthesized pilot receiver 141.

The outputs of summing circuits 124 and 131 are coupled to respective vertical and horizontal polarization inputs to a transmit/receive antenna unit 125. Unit 125 also includes a horizontally polarized output coupled over link 133 to down-converter 134. As shown in FIG. 5, horizontally polarized signals are employed for west transmissions, while vertically polarized signals are used for east transmissions.

East remote site 130E contains a transmit/receive antenna unit 161 coupled to an associated up-converter 162 and down-converter 163 for coupling data signals with respect to a local east interface link. Similarly, west remote site 130W contains a transmit/receive antenna unit 171 coupled to an associated up-converter 172 and a down-converter 173 for coupling data signals with respect to a local west interface link.

Special remote (west) site 130S contains a transmit/receive antenna 181 coupled to an associated up-converter 182 and a down-converter 183, each of which is driven by a high precision, stabilized local oscillator 190. The output of down-converter 183 is looped through filter amplifier 184 to the input of up-converter 182 which has been offset in frequency by P (e.g. 9 MHz).

OPERATION

As pointed out above, in accordance with the embodiment of the invention illustrated in FIG. 5, satellite 200 contains a dedicated frequency translator 210 through which master site 110 carries out communications with west remote site 130W, and a dedicated frequency translator 220 through which master site 110 carries out communications with east remote site 130E. For measuring the frequency offset that takes place during east communications master site 110 employs precision oscillator 111. To obtain a measurement of the frequency offset that takes place during west communications, master site 110 makes use of the precision oscillator 190 at special remote site 130S.

More particularly, considering the measurement of the offset over the east link, a high precision pilot tone (e.g. 10 MHz), referenced to high precision oscillator 110 and shown diagrammatically in FIG. 5 as signal A is transmitted from master site 110 over east uplink 231 to satellite 200. Via east transceiver 220, satellite 200 returns the pilot signal A over east downlink 232 to the master site as a signal $A + \Delta E$, where $\Delta E$ is the offset through east transceiver unit 220 of satellite 200. The received signal is coupled over link 133 to down-converter 134, which is tuned by pilot receiver 142 to remove the frequency shift caused by the error ($-\Delta E$) in the east translation oscillator in the satellite. The frequency shift itself ($-\Delta E$) is derived from the voltage controlled oscillator, to which down-converter 134 is referenced, in accordance with the output of east pilot receiver 142 on link 143, and is supplied over link 144 to east up-converter 145 for premodifying TDM communications to an east remote site, identified as signal B on input link 152, prior to transmission. Consequently, outgoing eastbound data signals are transmitted at a complementary frequency B$-\Delta E$ over uplink 231. When relayed from the satellite over downlink 261, the offset through the satellite restores the data signals to their original frequency B.

Communications ($D_E$) from east remote site 130E are transmitted over uplink 262 and subjected to the offset $\Delta E$ through the satellite, so as to be relayed over downlink 232 as $D_E + \Delta E$ to the master site. As pointed out above, since down-converter 134 is referenced to the output of east pilot receiver 142, the offset ($\Delta E$) is removed, so that the original frequency $D_E$ transmitted by east remote site 130E is output over link 135.

Precision pilot signal A is also used in conjunction with a second precision signal P to measure the offset through the west transceiver 210 within satellite 200. For this purpose the pilot signal A is transmitted over west uplink 241 and downlink 242 to special remote site 130S. The effect of the offset $\Delta W$ through the satellite is shown in FIG. 5 as a signal A$+\Delta W$. At remote site 130S, the received signal is offset by a prescribed precision reference P (e.g. from one to nine MHz.) as established by high stability oscillator 190 and retransmitted over uplink 251 at a frequency A$+\Delta W+P$ to the master site. Since this retransmitted signal is passed through the east translator it emerges on downlink 232 at a frequency A$+\Delta W+P+\Delta E$. At the master site, the output of down-converter 134, in which the east offset ($\Delta E$) is removed, is coupled to synthesized pilot receiver 141 which is referenced to oscillator 111, so that the west offset $-\Delta W$ is extracted over link 153. The west frequency shift itself ($-\Delta W$) as derived from the voltage controlled oscillator, to which synthesized pilot receiver 141 is referenced, is supplied over link 153 to west up-converter 154 for premodifying TDM communications to west remote site 130W, identified as signal C on input link 155, prior to transmission. Consequently, outgoing westbound data signals are transmitted at a complementary frequency C$-\Delta W$ over uplink 241. When relayed from the satellite over downlink 271, the offset through the satellite restores the data signals to their original frequency C.

Communications ($D_W$) from west remote site 130W are transmitted over uplink 272 and subjected to the offset $\Delta E$ through the satellite, so as to be relayed over downlink 232 as $D_W + \Delta E$ to the master site. As pointed out above, since down-converter 134 is referenced to the output of east pilot receiver 142, the offset ($\Delta E$) is removed so that the original frequency $D_W$ transmitted by west remote site 130W is output over link 135.

As will be appreciated from the foregoing description of the present invention, in a time division multiple access satellite communications system having a master site and one or more remote sites, frequency offset through one or more translation oscillators in the satellite is corrected by looping a reference pilot at the master site using a high precision reference oscillator. Any frequency offset to which the pilot is subjected is used to fine tune the master site down converter, so as to remove the offset and precorrect an up-converter that operates off the precision oscillator and through which information signals to be conveyed to a remote site are transmitted. Because of this precorrection, the signals received by the remote site are at the correct frequency, so that it is unnecessary to install a precision reference oscillator at each remote site. The highly precise received signal can now be used as a reference to control the frequency of signals transmitted from the remote site back to the master site.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a communication system having a first station for transmitting message signals over a communications link to a second station, said communications link subjecting signals transmitted thereover to a modification of a characteristic thereof, a method of enabling message signals transmitted from said first station to be received at said second station without said characteristic modification so that the information contained there in may be recovered at said second station comprising the steps of:

at said first station,
(a) transmitting a signal over the communications link for reception by the first station;
(b) monitoring the signal received in step (a) relative to said transmitted signal to determine said modification of a characteristic of signals transmitted over said communications link;
(c) subjecting message signals, comprising information not related to any portion of said modification of a characteristic of signals over said communications link, to a premodification of said characteristic thereof that is effectively complementary to the monitored modification of the characteristic of signals by said communications link, so that, when transmitted over said communications link from said first station to said second station, message signals that have been premodified are received by said second station effectively free of the modifications imparted by the first station and said communications link; and
(d) at the second station, determining a preselected characteristic of the received message signals and controlling a preselected characteristic of message signals to be transmitted from the second station to the first station using the determined preselected characteristic of the received message signals.

2. A method according to claim 1, wherein said modification of a characteristic of signals corresponds to a shift in the frequency of said signals.

3. A method according to claim 1, wherein said communications link comprises a satellite communications link and said modification of signals corresponds to a translation of the frequency of signals relayed through a satellite.

4. For use in a communication system wherein message signals are transmitted between first and second stations over a communications link that subjects signal modification of a characteristic thereof, a method of communicating between said first and second stations over said communications link in the presence of said modification comprising the steps of:

at said first station, (a) transmitting a signal over the communications link for reception by the first station and monitoring the received signal relative to the transmitted signal to determine said modification of a characteristic of signals transmitted over said communications link;

(b) subjecting message signals to be transmitted over said communications link from said first station to said second station to a premodification of said characteristic thereof that is effectively complementary to the monitored modification of step (a); and (c) transmitting message signals, which carry information not related to the determined modification of a characteristic of signals transmitted over the communications link that have been subjected to a premodification with the complementary characteristic in step (b) over said communications link to said second station; and at said second station (d) receiving the premodified message signals that have been transmitted over said communications link from said first station in step (c) effectively free of the modification imparted by said (b) and the communications link, and determining therefrom a preselected characteristic of the received message signals;

(e) controlling a preselected characteristic of message signals to be transmitted over said communications link from said second station to said first station using the preselected characteristic determined from the message signals received in step (b); and (f) transmitting message signals, a preselected characteristic of which is controlled in step (e), from said second station over said communications link to said first station.

5. A method according to claim 4, further including the step of, at said first station;

(g) subjecting signals that have been transmitted over said communications link from said second station to said first station in step (f), and have been imparted with the said modification of a characteristic of signals while being transmitted over said communications link, to a modification of said characteristic thereof using the modification of a characteristic of signals monitored in step (a) that is effectively complementary to the modification of signals transmitted over said communications link from said second station to said first station.

6. A method according to claim 5, wherein said communications link comprises a satellite communications link and said modification of a characteristic corresponds to a translation of the frequency of signals transmitted through said satellite.

7. A method according to claim 6, wherein step (a) comprises the steps of;

(a-1) transmitting a pilot frequency over a link from said first station through said satellite to said first station; and (a-2) monitoring a frequency translation of said pilot frequency that has occurred in the execution of step (a-1).

8. A method according to claim 7, wherein step (b) comprises shifting the frequency of message signals to be transmitted by an amount corresponding to the magnitude of translation, but in a direction complementary to the direction, of the foregoing translation monitored in step (a-2).

9. A method according to claim 8, wherein step (e) comprises controlling the frequency of message signals to be transmitted over said communications link from said second station to said first station in accordance with the frequency of signals received in step (d).

10. A method according to claim 9, wherein step (g) comprises shifting the frequency of the message signals received at said first station by an amount corresponding to the magnitude of and in a direction complementary to the direction of the frequency translation introduced by the communications link as monitored in step (a).

11. For use in a satellite communication system wherein message signals are transmitted between first and second earth stations over a satellite communications link containing a communications satellite that subjects signals transmitted therethrough to a frequency translation, a method of communicating between said first and second stations over said communications link in the presence of said frequency translation comprising the steps of:

at said first station, (a) transmitting a pilot frequency signal through said communications satellite so as to subject said pilot frequency to said frequency translation and monitoring the frequency translation of said pilot frequency signal as received at said first station subsequent to its transmission through said communications satellite;

(b) subjecting message signals, which comprise information not related to said monitored frequency translation monitored in step (a), to be transmitted over said communication link from said first station to said second station to a frequency translation that is effectively complementary to the frequency translation monitored in step (a); and (c) transmitting message signals that have been subjected to the complementary frequency translation of step (b) over said communications link to said second station; and at said second station, (d) receiving the message signals that have been transmitted in step (c) over said communications link from said first station, which received message signals are effectively free of any frequency translation imparted by the first station and the communications link, and determining therefrom a preselected characteristic;

(e) controlling a preselected characteristic of message signals to be transmitted over said communications link from said second station to said first station using the preselected characteristic determined in step (d); and (f) transmitting message signals, a preselected characteristic of which is controlled in step (e), from said second station over said communications link to said first station.

12. A method according to claim 11, further comprising the steps of, at said first station, (g) shifting the frequency of received message signals that have been transmitted over said communications link from said second station in step (f) by an amount that is complementary to the frequency translation introduced by said communications link as monitored in step (a).

13. For use in a satellite communications system wherein signals are transmitted between a master station and a plurality of remote stations over satellite communications links containing a communications satellite that subjects signals transmitted therethrough from said master station to one of said remote stations to a first frequency translation, a method of communicating between said master and remote stations over said satellite communications links in the presence of said first and second frequency translations comprising the steps of:

at said master station,
(a) transmitting a pilot frequency signal through said communications satellite so as to subject said pilot frequency signal to said first frequency translation and monitoring the frequency translation of said pilot frequency signal as received at said master station subsequent to its transmission through said communications satellite;
(b) subjecting message signals, comprising information not related to said monitored frequency translation, to be transmitted over said satellite communications link from said master station to said one of said remote stations to a frequency translation that is effectively complementary to the frequency translation monitored in step (a); and
(c) transmitting the message signals that have been subjected to the complementary frequency translations of step (b) over said satellite communications link to said one of said remote stations; and at said one of said remote stations,
(d) receiving signals that have been transmitted over said communications link from said master station in step (c) effectively free of the frequency translation imparted by step (b) and said satellite communications link, and determining therefrom a preselected characteristic of the received message signal;
(e) controlling a preselected characteristic of message signals to be transmitted over said communications link from said one remote station to said master station using the preselected characteristic determined from the message signals received in step (d); and
(f) transmitting message signals, a preselected characteristic of which is controlled in step (e), from said one remote station over said communications link to said master station.

14. A method according to claim 13, wherein the communications satellite also subjects signals transmitted therethrough from said master station to another one of said remote stations to a second frequency translation, the method further comprising the steps of:

at a selected station,
(g) transmitting a reference frequency signal through said communications satellite so as to subject said reference frequency signal to said second frequency translation; and at said master station,
(h) monitoring the second frequency translation of said reference frequency signal transmitted in step (g) as received at said master station subsequent to its transmission through said communications satellite;
(i) subjecting message signals to be transmitted over said satellite communications link from said master station to the another of said remote stations to a frequency translation that is effectively complementary to the second frequency translation monitored in step (h); and transmitting message signals that have been subjected to a premodification with the complementary frequency translation of step (i) over said satellite communications link to said another of said remote stations.

15. For use in a satellite communications system wherein signals are transmitted between a master station and a plurality of remote stations over satellite communications links containing a communications satellite that subjects signals transmitted therethrough from said master station to said remote stations to a first frequency translation, a method of communicating between said master and remote stations over said satellite communications links in the presence of said first and second frequency translations comprising the steps of:

at said master station,
(a) transmitting a pilot frequency signal through said communications satellite so as to subject said pilot frequency signal to said first frequency translation and monitoring the frequency translation of said pilot frequency signal as received at said master station subsequent to its transmission through said communications satellite;
(b) subjecting message signals, comprising information not related to said monitored frequency translation, to be transmitted over said satellite communications link from said master station to said remote stations to a premodification of a frequency translation that is effectively complementary to the frequency translation monitored in step (a); and
(c) transmitting message signals that have been subjected to a premodification with the complementary frequency translation of step (b) over said satellite communications link to said remote stations; and at said remote stations,
(d) receiving the premodified message signals that have been transmitted over said communications link from said master station in step (c) effectively free of the modification imparted by said master station and communications satellite, and determining therefrom a preselected characteristic of the received message signal;
(e) controlling a preselected characteristic of message signals to be transmitted over said communications link from said one remote station to said master station using the preselected characteristic determined from the message signals received in step (d); and
(f) transmitting message signals, a preselected characteristic of which is controlled in step (e), from said remote stations over said communications link to said master station.

16. A method according to claim 15, wherein said communications satellite also subjects signals transmitted therethrough from one of said remote stations to said master station to a second frequency translation, the method further comprising the steps of:

at said one of said remote stations, (g) transmitting message signals over said communications link through said satellite to said master station so as to subject said message signals to said second frequency translation;

at a selected station, (h) transmitting a reference frequency signal through said communications satellite so as to subject said reference frequency signal to said second frequency translation; and at said master station, (i) monitoring the second frequency translation of said reference frequency signal as imparted by said communications satellite and received at said master station subsequent to its transmission through said communications satellite; and (j) shifting the frequency of received message signals that have been been transmitted from said one of said remote stations in step (g) by an amount that is complementary to the second frequency translation monitored in step (i).

17. For use with a communication system having a first station for transmitting signals over a communication link to a second station, said communication link subjecting signals transmitted thereover to a modification of a characteristic thereof, an arrangement for enabling signals transmitted from said first station to be received at said second station without said characteristic modification so that information contained there may be recovered at said second station comprising:

at said first station,
first means for transmitting a signal over the communication link for reception by the first station and monitoring said modification of a characteristic of signals transmitted over said communication link; and
second means for subjecting message signals, comprising information not related to said modification of a characteristic of signals, to be transmitted from said first station to said second station to a premodification of said characteristic thereof that is effectively complementary to the monitored modification of a characteristic of signals imparted by said communication link, so that, when transmitted over said communication link from said first station to said second station, signals that have been premodified are received by said second station effectively free of the modification imparted by said communication link.

18. An arrangement according to claim 17, wherein said modification of a characteristic of signals corresponds to a shift in the frequency of said signals.

19. An arrangement according to claim 17, wherein said communications link comprises a satellite communications link and said modification of signals corresponds to a translation of the frequency of signals relayed through a satellite.

20. For use in a communication system wherein message signals are transmitted between first and second stations over a communications link that subjects signal modification of a characteristic thereof, an arrangement for communicating between said first and second stations over said communications link in the presence of said modification comprising:

at said first station,
first means for transmitting a signal over the communications link for reception by the first station and monitoring said modification of a characteristic of signals transmitted over said communications link; and second means for subjecting message signals, comprising information not related to said monitored modification of a characteristic of signals, to be transmitted over said communications link from said first station to said second station to a premodification of said characteristic thereof that is effectively complementary to the monitored modification by the first means;

at said second station,
third means for receiving message signals that have been premodified by the second means and transmitted over said communications link from said first station effectively free of the modification imparted by the second means and the communications link and for determining therefrom a preselected characteristic of the received signal;
fourth means for controlling a preselected characteristic of message signals to be transmitted over said communications link from said second station to said first station using the preselected characteristic determined by the third means from message signals received by said third means; and
fifth means for transmitting message signals, a preselected characteristic of which is controlled by said fourth means, from said second station over said communications link to said first station.

21. An arrangement according to claim 20, further including at said first station;
sixth means for subjecting message signals that have been transmitted over said communications link from said second station to said first station by said fifth means, and have been imparted with said modification of signals while being transmitted over said communications link, to a modification of said characteristic thereof in accordance with the modification monitored by said first means that is effectively complementary to the modification of signals transmitted over said communications link from said second station to said first station.

22. An arrangement according to claim 21, wherein said communications link comprises a satellite communications link and said modification of a characteristic corresponds to a translation of the frequency of signals transmitted through said satellite.

23. An arrangement according to claim 22, wherein said first means comprises:
means for transmitting a pilot frequency over a link from said first station through said satellite to said first station; and
means for monitoring a frequency translation of said pilot frequency as a result of its transmission through said satellite.

24. An arrangement according to claim 23, wherein said second means comprises means for shifting the frequency of message signals to be transmitted to said second station by an amount corresponding to the magnitude of frequency translation, but in a direction complementary to the direction, of the foregoing frequency translation monitored by said first means monitoring means.

25. An arrangement according to claim 24, wherein said fourth means comprises means for controlling the frequency of message signals to be transmitted over said communications link from said second station to said first station in accordance with the frequency of signals received by said third means.

26. An arrangement according to claim 25, wherein said sixth means comprises means for shifting the frequency of message signals received at said first station from said second station by an amount corresponding to the magnitude of and in a direction complementary to the direction of the frequency translation monitored by said first means.

27. For use in a satellite communication system wherein message signals are transmitted between first and second earth stations over a satellite communications link containing a communications satellite that subjects signals transmitted therethrough to a frequency translation, an arrangement for communicating between said first and second stations over said communications link in the presence of said frequency translation comprising:
at said first station,
first means for transmitting a pilot frequency signal through said communications satellite so as to subject said pilot frequency signal to said frequency translation and monitoring the frequency translation of said pilot frequency signal as received at said first station subsequent to its transmission through said communications satellite;
second means for subjecting message signals, comprising information not related to the monitored frequency translation by the first means, to be transmitted over said communications link from said first station to said second station to a frequency translation that is effectively complementary to the frequency translation monitored by said first means; and
third means for transmitting message signals that have been subjected to the complementary frequency translation of said second means over said communications link to said second station; and
at said second station,
fourth means for receiving message signals that were subjected to the complementary frequency translation by said second means, and have been transmitted over said communications link from said first station, effectively free of the frequency translation imparted by said second means and the communications link, and for determining therefrom a preselected characteristic of the received signal;
fifth means for controlling a preselected characteristic of message signals to be transmitted over said communications link from said second station to said first station using the preselected characteristic determined by the fourth means from message signals received by said fourth means; and
sixth means for transmitting message signals, a preselected characteristic of which is controlled by said fifth means, from said second station over said communications link to said first station.

28. An arrangement according to claim 27, further comprising
at said first station,
seventh means for shifting the frequency of received message signals that have been transmitted over said communications link from said second station by said sixth means by an amount that is complementary to the frequency translation monitored by said first means.

29. For use in a satellite communications system wherein signals are transmitted between a master station and a plurality of remote stations over satellite communications links containing a communications satellite that subjects signals transmitted therethrough from said master station to one of said remote stations to a first frequency translation, an arrangement for communicating between said master and remote stations over said satellite communications links in the presence of said first and second frequency translations comprising:
at said master station,
first means for transmitting a pilot frequency signal through said communications satellite so as to subject said pilot frequency signal to said first frequency translation and monitoring the frequency translation of said pilot frequency signal as received at said master station subsequent to its transmission through said communications satellite;
second means for subjecting message signals, comprising information not related to the monitored frequency translation by the first means, to be transmitted over said satellite communications link from said master station to said one of said remote stations to a frequency translation that is complementary to the frequency translation monitored by said first means; and
third means for transmitting message signals that have been subjected to the complementary frequency translation of said second means over said satellite communications link to said one of said remote stations; and
at said one of said remote stations,
fourth means for receiving message signals, that have been transmitted over said communications link from said master station by said third means, effectively free of any frequency translation imparted by the second means and the communications satellite for determining therefrom a preselected characteristic of the received signals;
fifth means for controlling a preselected characteristic of message signals to be transmitted over said communications link from said one remote station to said master station using the preselected characteristic determined by said fourth means; and
sixth means for transmitting signals, a preselected characteristic of which is controlled by said fifth means, from said one remote station over said communications link to said master station.

30. An arrangement according to claim 29, wherein said communications satellite also subjects signals transmitted therethrough from said master station to another of said remote stations to a second frequency translation, the arrangement further comprising:
at a selected station,
seventh means for transmitting a reference frequency signal through said communications satellite so as to subject said reference frequency signal to said second frequency translation; and
at said master station,
eighth means for monitoring the second frequency translation of said reference frequency signal as received at said master station subsequent to its transmission through said communications satellite;
ninth means for subjecting message signals to be transmitted over said satellite communications link from said master station to said another of said remote stations to a frequency translation that is effectively complementary to the second frequency translation monitored by said eighth means; and tenth means for transmitting message signals, that have been subjected to a premodification with the complementary frequency translation of said ninth means, over said satellite communications link to said another of said remote stations.

31. For use in a satellite communications system wherein signals are transmitted between a master station and a plurality of remote stations over satellite communications links containing a communications satellite that subjects signals transmitted therethrough from said master station to said remote stations to a first frequency translation an arrangement for communicating between said master and remote stations over said satellite communications links in the presence of said first and second frequency translations comprising:

at said master station, first means for transmitting a pilot frequency signal through said communications satellite so as to subject said pilot frequency signal to said first frequency translation and monitoring the frequency translation of said pilot frequency signal as received at said master station subsequent to its transmission through said communications satellite;

second means for subjecting message signals, comprising information not related to the monitored frequency translation by the first means, to be transmitted over said satellite communications link from said master station to said remote stations to a frequency translation that is effectively complementary to the frequency translation monitored by said first means; and third means for transmitting message signals, that have been subjected to the complementary frequency translation of said second means, over said satellite communications link to said remote stations; and at said remote stations, fourth means for receiving premodified message signals that have been transmitted over said communications link by the third means at said master station effectively free of the frequency translation imparted by said third means and said satellite communications link, and determining therefrom a preselected characteristic of the received message signal;

fifth means for controlling a preselected characteristic of signals to be transmitted over said communications link from said one remote station to said master station using the preselected characteristic determined from the message signals received by said fourth means; and sixth means for transmitting message signals, a preselected characteristic of which is controlled by said fifth means, from said remote stations over said communications link to said master station.

32. An arrangement according to claim 31, wherein said communications satellite also subjects signals transmitted therethrough from one of said remote stations to said master station to a second frequency translation, the arrangement further comprising at said one of said remote stations, seventh means for transmitting message signals over said communications link through said satellite to said master station so as to subject said signals to said second frequency translation;

at a selected station, eighth means for transmitting a reference frequency signal through said communications satellite so as to subject said reference frequency signal to said second frequency translation; and at said master station, ninth means for monitoring the second frequency translation of said reference frequency signal as imparted by said communications satellite and received at said master station subsequent to its transmission through said communications satellite; and tenth means for shifting the frequency of received message signals that have been transmitted from said one remote station by said seventh means by an amount that is complementary to the second frequency translation monitored by said ninth means.

* * * * *